US012737834B2

(12) United States Patent
Guo

(10) Patent No.: US 12,737,834 B2
(45) Date of Patent: Sep. 15, 2026

(54) DISPLAYING IMAGE DATA IN A VEHICLE WITH CHANGING PROJECTION SURFACE

(71) Applicant: CONNAUGHT ELECTRONICS Ltd., Tuam (IE)

(72) Inventor: Huanqing Guo, Tuam (IE)

(73) Assignee: CONNAUGHT ELECTRONICS Ltd., Tuam (IE)

( * ) Notice: Subject to any disclaimer, the term of this patent is extended or adjusted under 35 U.S.C. 154(b) by 0 days.

(21) Appl. No.: 19/119,026

(22) PCT Filed: Oct. 5, 2023

(86) PCT No.: PCT/EP2023/077559

§ 371 (c)(1),
(2) Date: Apr. 7, 2025

(87) PCT Pub. No.: WO2024/074609

PCT Pub. Date: Apr. 11, 2024

(65) Prior Publication Data

US 2026/0148333 A1 May 28, 2026

(30) Foreign Application Priority Data

Oct. 6, 2022 (DE) ........................ 10 2022 125 774

(51) Int. Cl.

| | |
|---|---|
| ***G06T 3/08*** | (2024.01) |
| ***G06T 7/80*** | (2017.01) |
| ***H04N 9/31*** | (2006.01) |

(52) U.S. Cl.

CPC .................. *G06T 3/08* (2024.01); *G06T 7/80* (2017.01); *H04N 9/3185* (2013.01);

(Continued)

(58) Field of Classification Search

CPC ... G06T 3/08; G06T 7/80; G06T 2207/10016; G06T 2207/30252; H04N 9/3185; H04N 9/3194

See application file for complete search history.

(56) References Cited

U.S. PATENT DOCUMENTS 7,161,616 B1 * 1/2007 Okamoto .............. G06T 15/205 348/E7.086
7,307,655 B1 * 12/2007 Okamoto ................ G06T 15/10 348/222.1

(Continued)

FOREIGN PATENT DOCUMENTS

DE 10 2015 105 529 A1 10/2016
DE 10 2016 124 978 A1 6/2018

(Continued)

OTHER PUBLICATIONS

International Search Report issued in corresponding PCT Application No. PCT/EP2023/077559, dated Jan. 30, 2024 (4 Pages).

(Continued)

*Primary Examiner* — John R Schnurr

(74) *Attorney, Agent, or Firm* — Osha Bergman Watanabe & Burton LLP

(57) ABSTRACT

Methods and systems for displaying image data in a vehicle are disclosed herein. A method for displaying image data include providing initial and final projection surfaces; receiving a video stream and is buffered in a buffer storage, which is updated at a frame rate. The method includes reading out image data at a readout rate from the buffer at an initial readout instance, intermediate readout instances and a final readout instance. The method includes determining respective sets of initial and final sampling points on the projection surfaces. For each of the intermediate readout instances, the method includes determining intermediate sampling points, which interpolate between the final sam- (Continued)

pling points and the respective initial sampling points, and an intermediate projection surface containing the intermediate sampling points. The method includes projecting the read out image data to the respective intermediate projection surface and a corresponding image is displayed on a display device.

14 Claims, 4 Drawing Sheets

(52) U.S. Cl.
CPC . *H04N 9/3194* (2013.01); *G06T 2207/10016* (2013.01); *G06T 2207/30252* (2013.01)

(56) References Cited

U.S. PATENT DOCUMENTS 10,076,997 B2* 9/2018 Quast ........................ B60R 1/28
10,328,856 B2* 6/2019 Ozasa ..................... G06T 11/00
10,474,898 B2* 11/2019 Watanabe ............... G06T 17/20
10,647,256 B2* 5/2020 Cano .................... H04N 23/698
10,692,284 B2* 6/2020 Milz ..................... G06T 19/003
10,793,067 B2* 10/2020 Ihlenburg .................. B60R 1/28
10,882,450 B2* 1/2021 Maejima ................ H04N 7/181
10,926,639 B2* 2/2021 Hatano .................. B60K 35/81
11,302,076 B2* 4/2022 Watanabe ............... B60R 1/002
11,410,430 B2 8/2022 Buerker et al.
12,088,952 B2* 9/2024 Nagata ................... H04N 5/272
2004/0260469 A1* 12/2004 Mizusawa ................. B60R 1/26 701/300
2008/0129756 A1* 6/2008 Iwano ....................... B60R 1/26 348/148
2008/0136912 A1* 6/2008 Iwano ................... G06T 1/0007 348/148
2011/0032357 A1* 2/2011 Kitaura ..................... G06T 5/80 348/148
2012/0069187 A1* 3/2012 Ozaki ...................... G09G 5/14 348/148
2013/0033602 A1* 2/2013 Quast ........................ B60R 1/27 348/148
2014/0278065 A1 9/2014 Ren
2014/0347450 A1* 11/2014 Han .......................... B60R 1/27 348/47
2015/0097954 A1* 4/2015 An ............................ B60R 1/27 348/148
2019/0164333 A1 5/2019 Fukushima et al.
2019/0215465 A1* 7/2019 Hayashi ............... H04N 5/2628
2020/0098164 A1* 3/2020 Bruns ................... G06T 15/205
2020/0134777 A1* 4/2020 Yamamoto ................ G06T 3/40
2020/0151942 A1* 5/2020 Guo ........................ G06T 15/20
2020/0262296 A1* 8/2020 Hatano ..................... B60R 1/26
2021/0006713 A1* 1/2021 Iino ........................... B60R 1/27
2021/0125401 A1 4/2021 Guo et al.
2021/0160437 A1* 5/2021 Higuchi .............. G06F 18/2163
2024/0371028 A1* 11/2024 Ohhashi .................... G06T 7/70
2025/0111539 A1* 4/2025 Kohara ..................... B60R 1/00
2025/0121774 A1* 4/2025 Han .......................... B60R 1/27
2025/0308087 A1* 10/2025 Mori ..................... G06T 3/4038
2026/0024226 A1* 1/2026 Ouchi ....................... G06T 3/08

FOREIGN PATENT DOCUMENTS

EP 3936400 A1 * 1/2022 ............... B60R 1/00
JP 2001339715 A * 12/2001
WO 2017-071926 A1 5/2017
WO 2021-228250 A1 11/2021
WO WO-2024061697 A1 * 3/2024 ........... G06T 3/4038

OTHER PUBLICATIONS

Written Opinion of the International Searching Authority issued in corresponding PCT Application No. PCT/EP2023/077559, dated Jan. 30, 2024 (7 Pages).
Search Report issued in corresponding German Application No. 10 2022 125 774.6, Dec. 12, 2022 (14 Pages).
"360° Wrap-Around Video Imaging Technology Ready for Integration with Fujitsu Graphics SoCs", retrieved at the URL <https://www.fujitsu.com/us/imagesgig5/360_OmniView_AppNote.pdf,> Sep. 12, 2022 (7 Pages).

* cited by examiner

DISPLAYING IMAGE DATA IN A VEHICLE WITH CHANGING PROJECTION SURFACE

The present invention is directed to a computer-implemented method for displaying image data in a vehicle, to an electronic vehicle guidance system for a vehicle, to a computer program and to a computer-readable storage medium.

Camera systems of vehicles, which may comprise one or more cameras arranged at different positions at the vehicle, for example, vehicle surround view systems, may be used for driver assistance functions or other functions for autonomous or semi-autonomous driving. A camera image or more than one camera image from different cameras, which are stitched together into a combined view, may be projected onto a predefined projection surface that is a part of a two-dimensional manifold in three-dimensional space, such as bowl-shape or the like. Furthermore, the projected image or the projected images can be transformed according to respective viewing parameters of a virtual observer, also denoted as virtual camera, such that the images appear as if they would have been ob-served by the virtual observer or captured by the virtual camera, respectively. The position and/or orientation of the virtual observer can, for example, be set or modified by a user or automatically by the vehicle.

In the application note "360° Wrap-Around Video Imaging Technology Ready for Integration with Fujitsu Graphics SoCs" (retrieved at the URL https://www.fu-jitsu.com/us/imagesgig5/360_OmniView_AppNote.pdf on Sep. 12th 2022), a video imaging technology that enables a 360° wrap-around view of a vehicle's perimeter in real time is described.

Document DE 10 2015 105 529 A1 relates to a method for transforming an image, which represents an area surrounding a motor vehicle from the perspective of a virtual camera. The image is represented by the transformation from a plurality of real images, which are generated by means of a plurality of real cameras of the motor vehicle.

Document US 2021/0125401 A1 relates to a method for representing an environmental region of a motor vehicle in an image, wherein real images of the environmental region are captured by real cameras of the motor vehicle and the image is generated from these real images. The image is represented from a perspective of a virtual camera in the environmental region, and the image is generated as a bowl shape.

In case the position and/or orientation of the virtual observer is changed while a video stream is being displayed, also the shape of the projection surface may change. One can perform the change as a hard switch that is, in particular, the projection surface is changed from an initial shape to a final shape without a transition. However, a change of the projection surface is not necessarily linked with a change of position and/or orientation of the virtual observer but may, for example, result from a change in user settings et cetera.

In view of this, it is an objective of the present invention to provide a possibility to achieve a smooth transition from one projection surface to another.

This objective is achieved by the respective subject-matter of the independent claims. Further implementations and preferred embodiments are a subject-matter of the dependent claims.

The invention is based on the idea to sample an initial projection surface and a final projection surface and to determine a respective intermediate projection surface for each of a plurality of consecutive intermediate readout instances for reading out a buffer storage buffering a video stream. Each intermediate projection surface contains intermediate sampling points interpolating between a sampling point on the final projection surface and a corresponding sampling point on the initial projection surface.

According to an aspect of the invention, a computer-implemented method for displaying image data in a vehicle, in particular a motor vehicle, is provided. Therein, a predefined initial projection surface and a predefined final projection surface are provided. A video stream depicting an environment, in particular an outer environment, of the vehicle is received from a camera system of the vehicle and the video stream is buffered in a buffer storage, wherein the buffer storage is updated at a predefined frame rate. Image data, in particular respectively updated image data, is read out at a predefined readout rate from the buffer storage. Therein, the read out happens at an initial readout instance, at a plurality of consecutive intermediate readout instances following the initial readout instance and at a final readout instance following the plurality of intermediate readout instances. A set of initial sampling points on the initial projection surface and a set of final sampling points on the final projection surface are determined. Therein, each final sampling point of the set of final sampling points is assigned to exactly one of the initial sampling points of the set of initial sampling points.

For each of the intermediate readout instances, a set of intermediate sampling points is determined, wherein each intermediate sampling point of the set of intermediate sampling points interpolates between one of the final sampling points and the respective assigned initial sampling point. For each of the intermediate readout instances, an intermediate projection surface containing the respective set of intermediate sampling points is determined. For each of the intermediate readout instances, the read out image data is projected to the respective intermediate projection surface and an intermediate image depending on the projected image data is displayed on a display device of the vehicle.

Unless stated otherwise, all steps of the computer-implemented method may be performed by at least one computing unit, in particular of the vehicle, which may also be denoted as a data processing apparatus. In particular, the at least one computing unit comprises at least one processing circuit, which is configured or adapted to perform the steps of the computer-implemented method. For this purpose, the at least one computing unit may for example store a computer program comprising instructions which, when executed by the at least one computing unit, cause the at least one computing unit to execute the computer-implemented method. The step of displaying the respective intermediate image on the display device can be understood such that the at least one computing unit controls the display device to display the respective intermediate image. The display is then not necessarily a part of the at least one computing unit. Alternatively, the display can be a part of the at least one computing unit.

A computing unit may in particular be understood as a data processing device, which comprises processing circuitry. The computing unit can therefore in particular process data to perform computing operations. This may also include operations to perform indexed accesses to a data structure, for example a look-up table, LUT.

In particular, the computing unit may include one or more computers, one or more micro-controllers, and/or one or more integrated circuits, for example, one or more application-specific integrated circuits, ASIC, one or more field-programmable gate arrays, FPGA, and/or one or more systems on a chip, SoC. The computing unit may also include one or more processors, for example one or more microprocessors, one or more central processing units, CPU, one or more graphics processing units, GPU, and/or one or more signal processors, in particular one or more digital signal processors, DSP, The computing unit may also include a physical or a virtual cluster of computers or other of said units.

In various embodiments, the computing unit includes one or more hardware and/or soft-ware interfaces and/or one or more memory units.

A memory unit may be implemented as a volatile data memory, for example a dynamic random access memory, DRAM, or a static random access memory, SRAM, or as a non-volatile data memory, for example a read-only memory, ROM, a programmable read-only memory, PROM, an erasable programmable read-only memory, EPROM, an electrically erasable programmable read-only memory, EEPROM, a flash memory or flash EEPROM, a ferroelectric random access memory, FRAM, a magnetoresistive random access memory, MRAM, or a phase-change random access memory, PCRAM.

The initial and final projection surface may for example be provided by storing them on a memory unit of the at least one computing unit, in particular by storing corresponding mathematical descriptions, look-up tables or another computer-readable dataset.

The video stream comprises a plurality of consecutive frames, each comprising respective image data that is stored to the buffer storage one after the other. In particular, when respective image data of a frame is stored to the buffer storage, the respective image data of a preceding frame may be deleted or overwritten. However, the buffer storage may also be a ring buffer. In any case, the latest image data stored in the buffer storage changes at the predefined frame rate and is read out at the predefined readout rate. The inverse readout rate therefore defines the time difference between the initial readout instance and the first intermediate readout instance, between every pair of consecutive intermediate readout instances and between the last intermediate readout instance and the final read out instance. Said frames do not necessarily make up the whole video stream but can be a part of it.

For example, for the initial readout instance, the read out image data may be projected to the initial projection surface and an initial image depending on the projected image data is displayed on the display device, in particular before any of the intermediate images is displayed. Alternatively or in addition, for the final readout instance, the read out image data may be projected to the final projection surface and a final image depending on the projected image data is displayed on the display device, in particular after displaying all of the intermediate images.

In particular, the respective projected image data according to the intermediate readout instances may be directly displayed on the display device or may be further processed and then displayed on the display device. In other words, an intermediate image may directly be given by the respective projected image data or by the further processed projected image data. Said further processing may, for example, comprise filtering steps or processing steps for stitching image data of different cameras together, transforming the image data according to the viewing position and/or orientation or other viewing parameters of a virtual observer et cetera.

A projection surface can, for example, be considered as a two-dimensional manifold in three-dimensional space. For example, the projection surface may be defined in a Cartesian coordinate system with coordinates X, Y, Z by means of a function f as Z=f(X, Y). However, the projection surface is not necessarily describable by means of such a function. In particular, the projection surface may, in some implementations, also be defined in a piece-wise manner with different functions for different parts of the three-dimensional space. The projection surface is, in particular, defined in a vehicle coordinate system, wherein the position and orientation of the vehicle is known, in particular fixed. For example, a specified reference point of the vehicle may be located in the origin of the coordinate system.

The projection surface can be a portion of the two-dimensional manifold. Consequently, different projection surfaces can correspond to different portions of the same two-dimensional manifold. Alternatively, different projection surface may correspond to portions of different two-dimensional manifolds as well, for example defined by different functions f(X,Y).

The intermediate projection surfaces can be constructed in various ways given the respective intermediate sampling points. For example, they can be given by respective polygon meshes, wherein the intermediate sampling points represent corners of polygons. The intermediate projection surfaces can also be given by respective spline surfaces, with the intermediate sampling points as control points. The intermediate projection surfaces can also be given by other surfaces interpolating between the intermediate sampling points.

The number of final sampling points may be smaller than or equal to the number of initial sampling points. The number of intermediate sampling points for a given intermediate readout instance is equal to the number of final sampling points. The intermediate projection surfaces describe a smooth transition from the initial projection surface to the final projection surface and for each intermediate readout instance, the respective intermediate image is displayed. Consequently, the resulting sequence of displayed images describes a smooth transition of an initial view to a final view. A user of the vehicle watching the display device does therefore not see an abrupt change in the displayed images due to an abrupt change in the projection surface.

In particular, all of the initial projection surface, the intermediate projection surfaces and the final projection surface may be different from each other. Thus, the displayed images change for each of the readout instances.

Since a respective intermediate image is displayed for each intermediate readout instance, the readout rate is, in particular, equal to or smaller than a refresh rate of the display device, preferably equal to the refresh rate. It is noted that the readout rate may be greater than the frame rate. In other words, the respective read out image data may remain unchanged for two or more consecutive intermediate readout instances. Nevertheless, the displayed images still change in general, since the intermediate projection surfaces change, in general. In other implementations, however, the readout rate may also be equal to or smaller than the frame rate meaning that the read out image data is different for each pair of subsequent intermediate readout instances.

According to several implementations, predefined initial viewing parameters of a virtual observer, which include an initial position of the virtual observer, and predefined final viewing parameters of the virtual observer, which include a final position of the virtual observer, are provided, in particular stored on a memory unit of the at least one computing unit. For each of the intermediate readout instances, intermediate viewing parameters of the virtual observer including a respective intermediate position of the virtual observer are determined. Therein, the intermediate position lies on a predefined curve connecting the initial position to the final position. For each of the intermediate readout instances, the read out image data is projected to the respective intermediate projection surface and transformed according to the respective intermediate viewing parameters. The respective intermediate image depends on, for example corresponds to, the projected and transformed image data.

In such implementations the change of the projection surface from the initial projection surface via the intermediate projection surfaces to the final projection surface, is accompanied by a change in the position of the virtual observer. Also the change in the position of the virtual observer occurs as a smooth transition. However, the dynamics of the change in the projection surface does not necessarily match the dynamics of the change in the position of the virtual observer. In other words, the position of the virtual observer may remain unchanged for two or more consecutive readout instances of the initial, intermediate and final readout instances.

Apart from the position of the virtual observer, the viewing parameters may, for example, comprise an orientation of the virtual observer. The viewing parameters may also include or define a field of view of the virtual observer, which is, in particular, also denoted as a vehicle camera. The viewing parameters may also include virtual mapping parameters describing the mapping function of a virtual camera.

The virtual observer can be located at arbitrary positions in the environment of the vehicle. Depending on the position and/or further viewing parameters of the virtual observer, the size of the projection surface may vary. In particular, the image data displayed on the display device appear as if they would have been captured by the virtual camera or viewed by the virtual observer, respectively.

The curve on which the intermediate positions lie may be a straight line or any other curve connecting the initial position to the final position. The user watching the displayed images has the impression as if the point of observation flies along the curve.

According to several implementations, the initial viewing parameters include an initial orientation of the virtual observer and the final viewing parameters include a final orientation of the virtual observer. For each of the intermediate readout instances, the respective intermediate viewing parameters include a respective intermediate orientation of the virtual observer.

The orientation of the virtual observer may for example be given by three orientation angles, for example Euler angles. The intermediate orientations may therefore be considered to lie on respective curves in the parameter space of the orientation angles connecting the initial orientation to the final orientation.

According to several implementations, the initial viewing parameters include an initial field of view of the virtual observer and the final viewing parameters include a final field of view of the virtual observer. For each of the intermediate readout instances, the respective intermediate viewing parameters include a respective intermediate field of view of the virtual observer.

The field of view of the virtual observer may for example be defined by two field of view angles, for example a horizontal opening angle and a vertical opening angle. The intermediate fields of view may therefore be considered to lie on respective curves in the parameter space of the field of view angles connecting the initial field of view to the final field of view.

According to several implementations, for each of the final sampling points, the intermediate sampling points interpolating between the final sampling point and the assigned initial sampling point for all intermediate readout instances lie on a straight line connecting the final sampling point and the assigned initial sampling point.

In this way, the shortest connection between the respective final and initial point is used for the interpolation. Thus, less intermediate projection surfaces may be required for a smooth transition.

According to several implementations, for each of the final sampling points respective distances between intermediate sampling points interpolating between the final sampling point and the assigned initial sampling point are identical for each pair of consecutive intermediate readout instances.

In particular, also the distance between the initial sampling point and the first intermediate sampling point as well as the distance between the final sampling point and the last intermediate sampling point are equal to the distance between consecutive pairs of intermediate sampling points.

In other words, the transition is carried out in a linear manner, which reduces the computational effort for computing the intermediate projection surfaces.

According to several implementations, the readout rate is greater than the frame rate.

Consequently, identical image data may read out from the buffer storage for at least two consecutive intermediate readout instances. Therefore, the transition appears smoother for the observing user.

Preferably, the readout rate is at least two times the frame rate, for example at least five times the frame rate. For example, a ratio of the readout rate to the frame rate may lie in the interval [5, 20].

Consequently, for each camera frame, the same buffered image data is read out at least twice or at least five times or at least a number of times given by said ratio at respective consecutive intermediate readout instances. Therefore, the transition appears smoother for the observing user.

In some implementations, the total number of intermediate readout instances may be adjusted to said ratio such that the initial readout instance, all intermediate readout instances and the final readout instance occur during a single frame and the respectively readout image data is the same. Thus, the whole transition may occur during a single frame, which makes the transition appear even smoother. However, the total number of intermediate readout instances may also be adjusted to said ratio such that the initial readout instance, all intermediate readout instances and the final readout instance occur during a predefined maximum number of frames.

According to several implementations, the initial projection surface is given by points fulfilling the equation $$Z = \sum_{i=1}^{n} a_i X^i + b_i Y^i + c.$$

In particular, the initial sampling points fulfil this equation. Therein, X, Y and Z denote Cartesian coordinates of the respective point on the initial projection surface, Z corresponds to a height above a predefined ground plane, on which the vehicle is located, n is an even integer equal to or greater than four, and $a_i$, $b_i$, and c are predefined real coefficients.

In other words, the initial projection surface is given by a polynomial of n-th degree in the two variables X, Y. Preferably, n=4. Consequently, the shape of the initial projection surface can be denoted as a bowl, which has a relatively flat portion in the area where the vehicle is located and rises relatively steeply farther away from the vehicle. In particular, the vehicle is centered at the origin of the coordinate system and the X-Y-plane corresponds to the ground plane. This represents a suitable approximation to the distances of the depicted objects.

For n=4, the above equation for Z can also be rewritten as $$Z = W\left[A(X - X_s)^4 + B(Y - Y_s)^4\right] - C.$$

The same holds, in some implementations, analogously for the final projection surface. In other words, in such implementations, the final projection surface is given by points fulfilling the equation $$Z = \sum_{i=1}^{n'} a_i' X^i + b_i' Y^i + c',$$

In particular, the final sampling points fulfil this equation. Therein, X, Y and Z denote Cartesian coordinates of the respective point on the final projection surface, Z corresponds to a height above the ground plane, n' is an even integer equal to or greater than four, and $a_i'$, $b_i'$ and c are predefined real coefficients. Preferably, n'=n.

It is noted that the intermediate projection surfaces, in particular intermediate sampling points of a given intermediate projection surface, does not necessarily fulfil such equations for polynomials in two variables.

According to several implementations, the initial projection surface comprises an initial base portion, which is given by an initial part of the ground plane, on which the vehicle is located, wherein the vehicle is located within the initial base portion, and an initial raised portion that adjoins the initial base portion at an outer boundary of the initial base portion. Alternatively or in addition, the final projection surface comprises a final base portion, which is given by a final part of the ground plane, wherein the vehicle is located within the final base portion, and a final raised portion that adjoins the final base portion at an outer boundary of the final base portion.

In particular, the initial base portion and/or the final base portion is convex or, in other words, the initial base portion and/or the final base portion or the respective outer boundary is a convex geometric figure, in particular a convex polygon. In contrast to the respective base portion, points on the respective raised portion have a non-zero height above the ground plane.

In some implementations, the construction using a base portion and a raised portion as described, may also be used for the intermediate projection surfaces.

For use cases or use situations which may arise in the computer-implemented method and which are not explicitly described here, it may be provided that, in accordance with the method, an error message and/or a prompt for user feedback is output and/or a default setting and/or a predetermined initial state is set.

According to a further aspect of the invention, an electronic vehicle guidance system for a vehicle is provided. The electronic vehicle guidance system comprises at least one computing unit, in particular for the vehicle, which stores a predefined initial projection surface and a predefined final projection surface, in particular on one or more memory units of the at least one computing unit. The at least one computing unit is configured to receive a video stream depicting an environment of the vehicle from a camera system of the vehicle and to buffer the video stream in a buffer storage, for example of the at least one computing unit, wherein the buffer storage is updated at a predefined frame rate. The at least one computing unit is configured to read out image data from the buffer storage at a predefined readout rate at an initial readout instance, a plurality of consecutive intermediate readout instances and a final readout instance.

The at least one computing unit is configured to determine a set of initial sampling points on the initial projection surface and a set of final sampling points on the final projection surface, wherein each final sampling point is assigned to exactly one of the initial sampling points. The at least one computing unit is configured to determine, for each of the intermediate readout instances, a set of intermediate sampling points, wherein each intermediate sampling point interpolates between one of the final sampling points and the respective assigned initial sampling point, and to determine an intermediate projection surface containing the set of intermediate sampling points. The at least one computing unit is configured to project, for each of the intermediate readout instances, the read out image data to the respective intermediate projection surface and to control a display device of the vehicle to display an intermediate image depending on the projected image data.

An electronic vehicle guidance system may be understood as an electronic system, configured to guide a vehicle in a fully automated or a fully autonomous manner and, in particular, without a manual intervention or control by a driver or user of the vehicle being necessary. The vehicle carries out all required functions, such as steering maneuvers, deceleration maneuvers and/or acceleration maneuvers as well as monitoring and recording the road traffic and corresponding reactions automatically. In particular, the electronic vehicle guidance system may implement a fully automatic or fully autonomous driving mode according to level 5 of the SAE J3016 classification. An electronic vehicle guidance system may also be implemented as an advanced driver assistance system, ADAS, assisting a driver for partially automatic or partially autonomous driving. In particular, the electronic vehicle guidance system may implement a partly automatic or partly autonomous driving mode according to levels 1 to 4 of the SAE J3016 classification. Here and in the following, SAE J3016 refers to the respective standard dated June 2018.

Guiding the vehicle at least in part automatically may therefore comprise guiding the vehicle according to a fully automatic or fully autonomous driving mode according to level 5 of the SAE J3016 classification. Guiding the vehicle at least in part automatically may also comprise guiding the vehicle according to a partly automatic or partly autonomous driving mode according to levels 1 to 4 of the SAE J3016 classification.

In some implementations, the electronic vehicle guidance system comprises the display device and/or the camera system.

According to several implementations, the readout rate is equal to or smaller than a refresh rate of the display device and/or, preferably and, the readout rate is greater than the frame rate, for example at least two times the frame rate, for example at least five times the frame rate.

Further implementations of the electronic vehicle guidance system according to the invention follow directly from the various embodiments of the computer-implemented method according to the invention and vice versa. In particular, individual features and corresponding explanations as well as advantages relating to the various implementations of the computer-implemented method according to the invention can be transferred analogously to corresponding implementations of the electronic vehicle guidance system according to the invention. In particular, the electronic vehicle guidance system according to the invention is designed or programmed to carry out the computer-implemented method according to the invention. In particular, the electronic vehicle guidance system according to the invention carries out the computer-implemented method according to the invention.

According to a further aspect of the invention, a computer program product comprising instructions is provided. When the instructions are executed by at least one computing unit, for example by the at least one computing unit of an electronic vehicle guidance system according to the invention, the instructions cause the at least one computing unit to carry out a computer-implemented method according to the invention.

According to a further aspect of the invention, a computer-readable storage medium is provided, which stores a computer program according to the invention.

Further features of the invention are apparent from the claims, the figures and the FIG. description. The features and combinations of features mentioned above in the description as well as the features and combinations of features mentioned below in the description of figures and/or shown in the figures may be comprised by the invention not only in the respective combination stated, but also in other combinations. In particular, embodiments and combinations of features, which do not have all the features of an originally formulated claim, may also be comprised by the invention. Moreover, embodiments and combinations of features which go beyond or deviate from the combinations of features set forth in the recitations of the claims may be comprised by the invention.

In the following, the invention will be explained in detail with reference to specific exemplary implementations and respective schematic drawings. In the drawings, identical or functionally identical elements may be denoted by the same reference signs. The description of identical or functionally identical elements is not necessarily repeated with respect to different figures.

In the figures.

Figure 1:
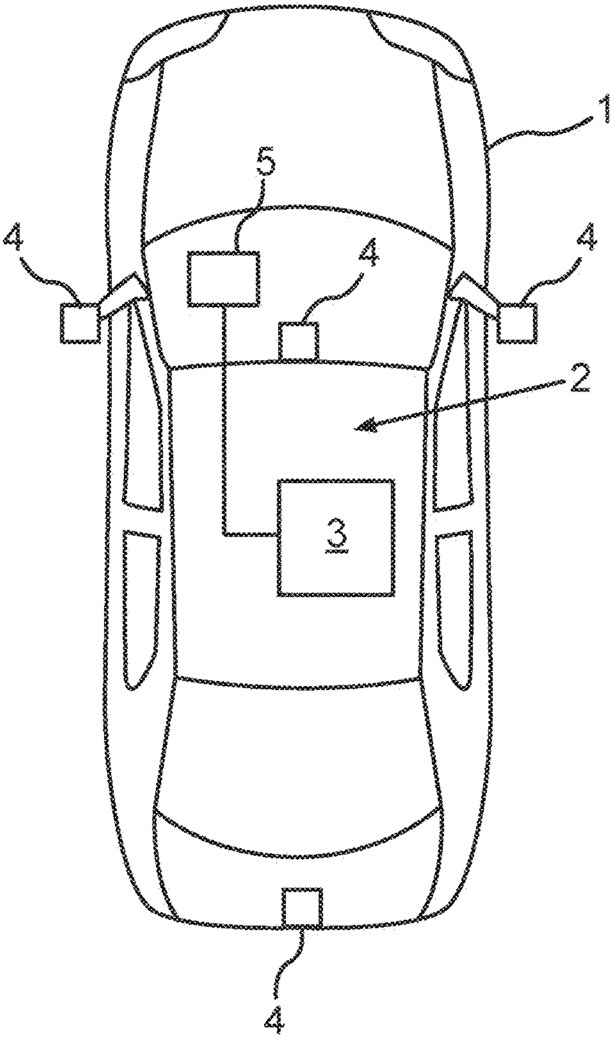
FIG. 1 shows schematically a vehicle with an exemplary implementation of an electronic vehicle guidance system according to the invention.

FIG. 1 shows schematically a vehicle 1 with an exemplary implementation of an electronic vehicle guidance system 2 according to the invention. The electronic vehicle guidance system 2 comprises a computing unit 3, which may in some implementations also represent two or more computing units. The vehicle 1, in particular the electronic vehicle guidance system 2, comprises a camera 4, for example a front camera, rear camera or side camera, and a display device 5.

The camera 4 is configured to generate a video stream depicting an environment of the vehicle 1 and provide it to the computing unit 3. The computing unit 3 is configured to control the display device 5 to display images depending on the video stream. To this end, the computing unit 3 may carry out a computer-implemented method for displaying image data in a vehicle 1 according to the invention.

Figures 2, 3, 4, 5:
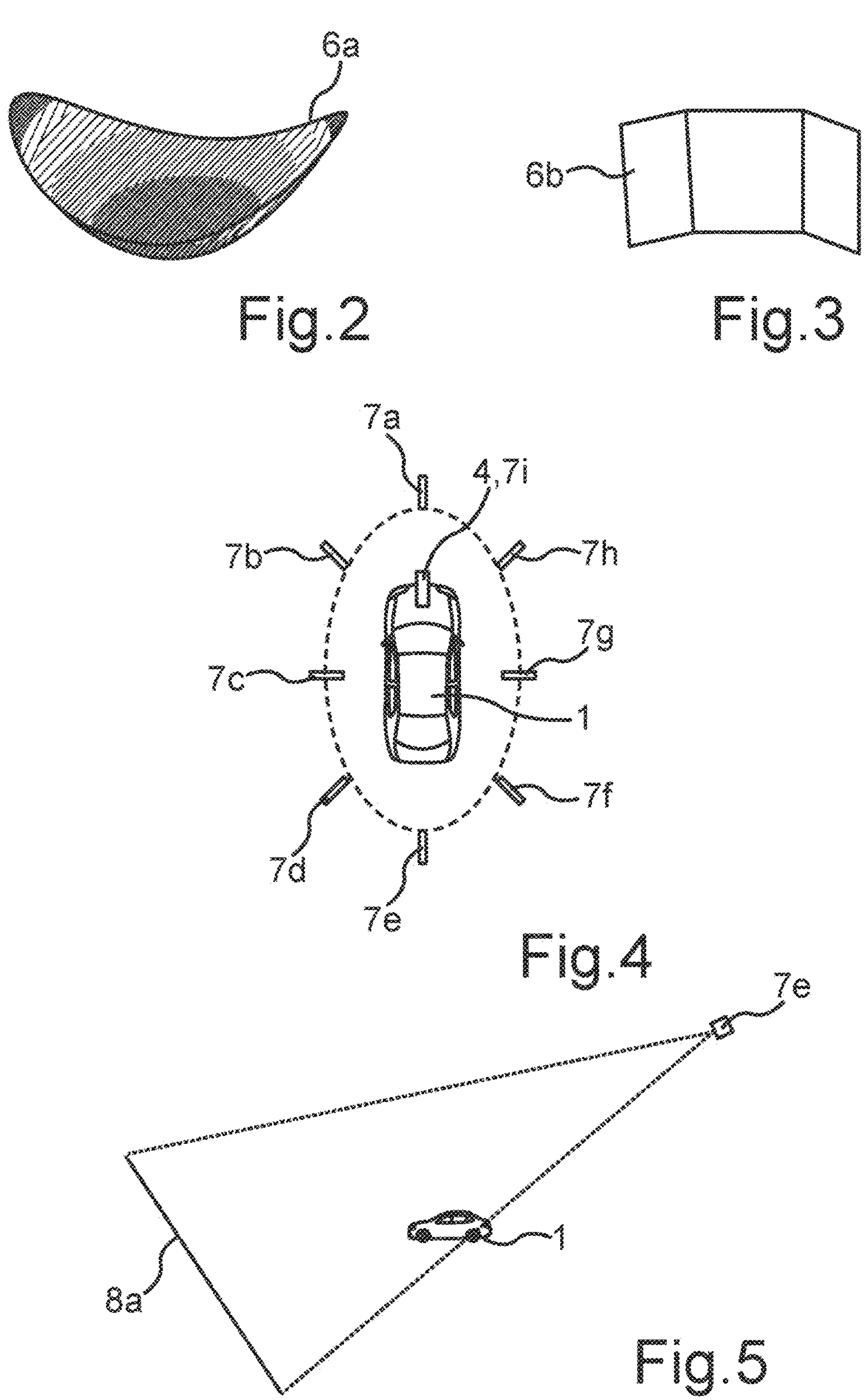
FIG. 2 shows schematically an example for a projection surface.
FIG. 3 shows schematically a further example for a projection surface.
FIG. 4 shows schematically a vehicle and exemplary positions of a virtual observer in a top view.
FIG. 5 shows schematically a vehicle and an exemplary position of a virtual observer in a side view.
Figure 6:
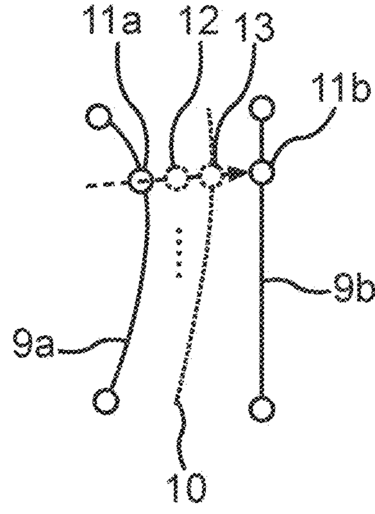
FIG. 6 shows schematically a transition of projection surfaces in an exemplary implementation of a computer-implemented method according to the invention.

The computing unit 3 stores a predefined initial projection surface 9*a* and a predefined final projection surface 9*b* (see FIG. 6). FIG. 2 illustrates an example for a shape of a projection surface 6*a* according to a bowl shape, while FIG. 3 illustrates another example, wherein the projection surface 6*b* consists of adjacent planes.

The computing unit 3 buffers the video stream in a buffer storage, wherein the buffer storage is updated at a predefined frame rate. It is noted that, in some implementations, parts of the computing unit 3, such as for example the buffer storage, may also be contained by the camera 4, in particular since the computing unit 3 may represent two or more computing units. Alternatively, the buffer storage may be a part of the computing unit 3 arranged externally to the camera 4.

The computing unit 3 reads out image data from the buffer storage at a predefined readout rate. In particular, the computing unit 3 reads out respective image data at an initial readout instance, a plurality of consecutive intermediate readout instances and a final readout instance. The computing unit 3 samples the initial projection surface 9*a* to determine a set of initial sampling points 11*a* on the initial projection surface 9*a* and the final projection surface 9*b* to determine a set of final sampling points 11*b* on the final projection surface 9*b*. Therein, each final sampling point 11*b* is assigned to exactly one of the initial sampling points 11*a*. For each of the intermediate readout instances, a set of intermediate sampling points 12, 13 is determined, wherein each intermediate sampling point 12, 13 interpolates between one of the final sampling points 11*b* and the respective assigned initial sampling point 11*a*, and determines an intermediate projection surface 10 containing the set of intermediate sampling points 12, 13. For each of the intermediate readout instances, the computing unit 3 projects the respectively read out image data to the respective intermediate projection surface 10 and controls the display device 5 to display an intermediate image depending on the projected image data.

In some implementations, the computing unit 3 may store predefined initial viewing parameters of a virtual observer 7*a*, 7*b*, 7*c*, 7*d*, 7*e*, 7*f*, 7*g*, 7*h*, 7*i* (see FIG. 4), which include an initial position of the virtual observer 7*a*, 7*b*, 7*c*, 7*d*, 7*e*, 7*f*, 7*g*, 7*h*, 7*i*, and predefined final viewing parameters of the virtual observer 7*a*, 7*b*, 7*c*, 7*d*, 7*e*, 7*f*, 7*g*, 7*h*, 7*i*, which include a final position of the virtual observer 7*a*, 7*b*, 7*c*, 7*d*,

*7e*, *7f*, *7g*, *7h*, *7i*. For each of the intermediate readout instances, the computing unit 3 determines intermediate viewing parameters of the virtual observer 7*a*, 7*b*, 7*c*, 7*d*, 7*e*, 7*f*, 7*g*, 7*h*, 7*i* including a respective intermediate position of the virtual observer 7*a*, 7*b*, 7*c*, 7*d*, 7*e*, 7*f*, 7*g*, 7*h*, 7*i*, wherein the intermediate position lies on a predefined curve connecting the initial position to the final position. For each of the intermediate readout instances, the respective intermediate image may be given by the projected and transformed image data.

As depicted in FIG. 4, the virtual observer 7*a*, 7*b*, 7*c*, 7*d*, 7*e*, 7*f*, 7*g*, 7*h*, 7, which may also be denoted as a virtual camera, can by located at arbitrary positions, especially around the vehicle 1, including a position of the real camera 4. The positions of the virtual observer 7*a*, 7*b*, 7*c*, 7*d*, 7*e*, 7*f*, 7*g*, 7*h*, 7*i* may for example lie within a distance range of 1 to 3 meters from the vehicle 1. When the position of the virtual observer 7*a*, 7*b*, 7*c*, 7*d*, 7*e*, 7*f*, 7*g*, 7*h*, 7*i* changes, in particular from the initial position via the intermediate positions to the final position, this may also be denoted as the virtual observer 7*a*, 7*b*, 7*c*, 7*d*, 7*e*, 7*f*, 7*g*, 7*h*, 7*i* flying from one position to the other.

Figure 7:
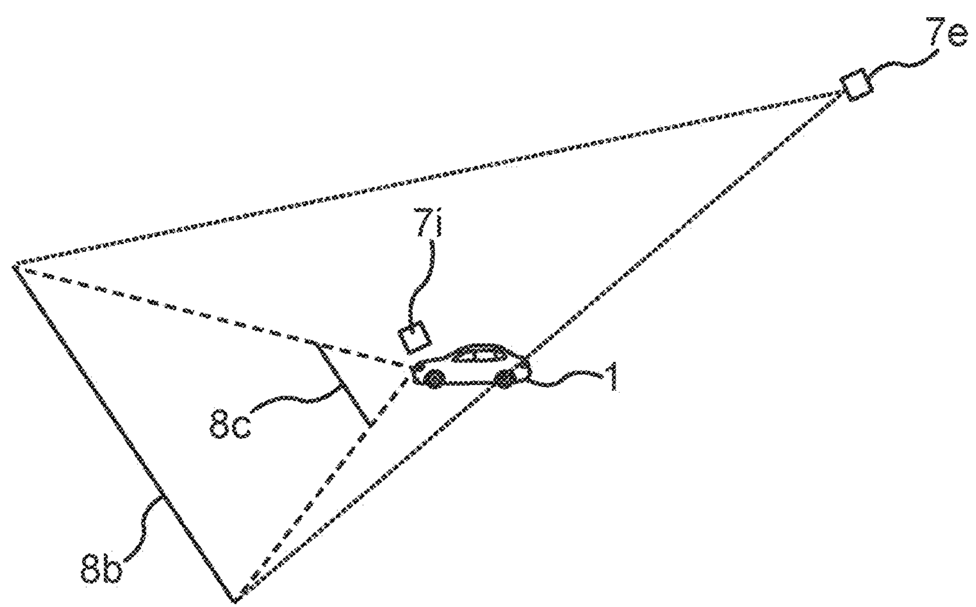
FIG. 7 shows schematically a vehicle and further exemplary positions of a virtual observer in a side view.

FIG. 5 shows the vehicle 1 and one of the positions of the virtual observer 7*e* in a side view as well as a corresponding projection surface 8*a*. FIG. 7 additionally shows a further position of the virtual observer 7*i*, which corresponds to the position of the camera 4, and the respective projection surface Sc. For example, the initial position may be the position of the virtual observer 7*i* and the final position may be the position of the virtual observer 7*e*. Alternatively, the position of the virtual observer 7*i* may correspond to one of the intermediate positions.

Figure 8:
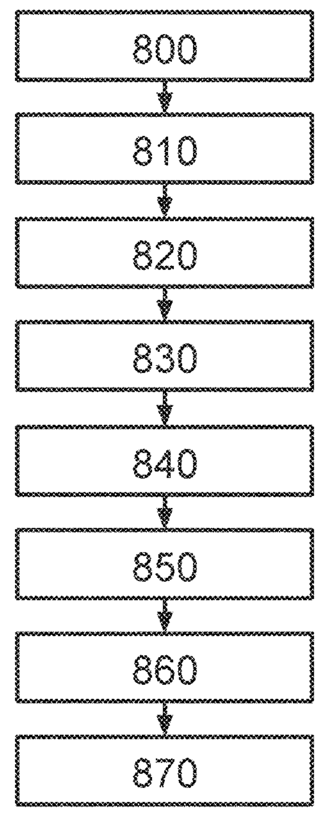
FIG. 8 shows a flow diagram of a further exemplary implementation of a computer-implemented method according to the invention.

FIG. 8 shows a flow diagram for a further exemplary implementation of a computer-implemented method according to the invention. In step 800, a view switch request may be generated by a user. In step 810, the virtual observer 7*a*, 7*b*, 7*c*, 7*d*, 7*e*, 7*f*, 7*g*, 7*h*, 7*i* flies from the initial position via the intermediate positions and reaches the last intermediate position in step 820. In step 830, the initial projection surface 9*a* is sampled and the final projection surface 9*b* is sampled in step 840, as described above. In step 850, the initial projection surface 9*a* is changed via the intermediate projection surfaces 10 as described and reaches the final projection surface 9*b* in step 860. Also, the virtual observer 7*a*, 7*b*, 7*c*, 7*d*, 7*e*, 7*f*, 7*g*, 7*h*, 7*i* flies from the last intermediate position to the final position in step 860. In optional step 870, an orientation of the virtual observer 7*a*, 7*b*, 7*c*, 7*d*, 7*e*, 7*f*, 7*g*, 7*h*, 7*i* is adapted. The described sequence can be understood such that, whenever the projection surface and/or the position of the virtual observer 7*a*, 7*b*, 7*c*, 7*d*, 7*e*, 7*f*, 7*g*, 7*h*, 7*i* changes, this corresponds to a readout instance and a corresponding image is displayed by the display device 5.

Figure 9:
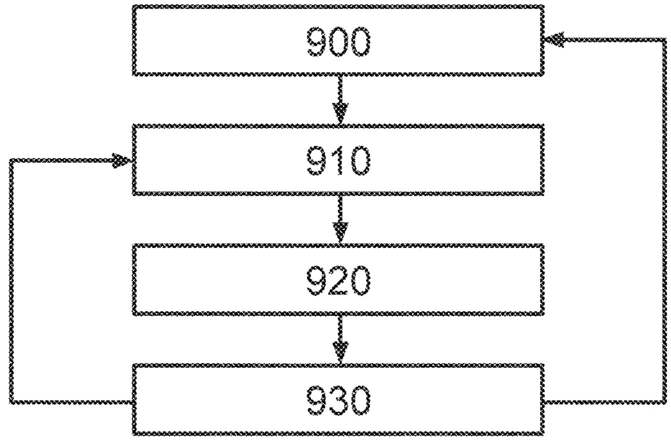
FIG. 9 shows a flow diagram of a further exemplary implementation of a computer-implemented method according to the invention.

FIG. 9 shows high level a flow diagram of a further exemplary implementation of the computer-implemented method according to the invention, wherein the readout rate is at least twice the frame rate. In step 900, the buffer storage is updated. In step 920, the image data is read out at the initial readout instance. In step 920, the projection surface is set to the initial projection surface 9*a*, the read out image data is projected to the initial projection surface 9*a* as described and the initial image is displayed. In step 930, it is checked whether the buffer storage has been updated again. If this is the case, the updated image data is read out in step 900 in the first intermediate readout instance, the projection surface is changed to the first intermediate projection surface 10 in step 910 and the first intermediate image is displayed in step 920. Otherwise, the previously read out image data is obtained at the first intermediate readout instance, the projection surface is changed to the first intermediate projection surface 10 in step 910 and the first intermediate image is displayed in step 920. These steps are repeated until the final image has been displayed.

The invention claimed is:

1. A computer-implemented method for displaying image data in a vehicle, the computer-implemented method comprising:

providing a predefined initial projection surface and a predefined final projection surface;

receiving a video stream depicting an environment of the vehicle from a camera system of the vehicle and the video stream is buffered in a buffer storage, wherein the buffer storage is updated at a predefined frame rate;

reading out image data at a predefined readout rate from the buffer storage at an initial readout instance, a plurality of consecutive intermediate readout instances and a final readout instance;

determining a set of initial sampling points on the initial projection surface and a set of final sampling points on the final projection surface, wherein each final sampling point is assigned to exactly one of the initial sampling points;

determining, for each of the intermediate readout instances, a set of intermediate sampling points, wherein each intermediate sampling point interpolates between one of the final sampling points and the respective assigned initial sampling point, and an intermediate projection surface containing the set of intermediate sampling points is determined; and projecting for each of the intermediate readout instances, the read out image data to the respective intermediate projection surface and an intermediate image depending on the projected image data is displayed on a display device of the vehicle.

2. The computer-implemented method according to claim 1, further comprising:

providing predefined initial viewing parameters of a virtual observer, which include an initial position of the virtual observer, and predefined final viewing parameters of the virtual observer, which include a final position of the virtual observer;

determining, for each of the intermediate readout instances, intermediate viewing parameters of the virtual observer including a respective intermediate position of the virtual observer, wherein the intermediate position lies on a predefined curve connecting the initial position to the final position; and projecting, for each of the intermediate readout instances, the read out image data to the respective intermediate projection surface and transformed according to the respective intermediate viewing parameters and the respective intermediate image depends on the projected and transformed image data.

3. The computer-implemented method according to claim 2, wherein the initial viewing parameters include an initial orientation of the virtual observer and the final viewing parameters include a final orientation of the virtual observer and, for each of the intermediate readout instances, the respective intermediate viewing parameters include a respective intermediate orientation of the virtual observer, and/or wherein the initial viewing parameters include an initial field of view of the virtual observer and the final viewing parameters include a final field of view of the virtual observer and, for each of the intermediate readout instances, the respective intermediate viewing parameters include a respective intermediate field of view of the virtual observer.

4. The computer-implemented method according to claim 1, further comprising:

projecting for the initial readout instance, the read out image data to the initial projection surface and an initial image depending on the projected image data is displayed on the display device; and/or projecting for the final readout instance, the read out image data to the final projection surface and a final image depending on the projected image data is displayed on the display device.

5. The computer-implemented method according to claim 1, wherein, for each of the final sampling points, the intermediate sampling points interpolating between the final sampling point and the assigned initial sampling point for all intermediate readout instances lie on a straight line connecting the final sampling point and the assigned initial sampling point.

6. The computer-implemented method according to claim 1, wherein for each of the final sampling points, respective distances between intermediate sampling points interpolating between the final sampling point and the assigned initial sampling point are identical for each pair of consecutive intermediate readout instances.

7. The computer-implemented method according to claim 1, wherein the readout rate is greater than the frame rate.

8. The computer-implemented method according to claim 1, wherein the readout rate is at least two times the frame rate.

9. The computer-implemented method according to claim 1, wherein the readout rate is equal to or smaller than a refresh rate of the display device.

10. The computer-implemented method according to claim 1, wherein the initial projection surface is given by points fulfilling the equation $$Z = \sum_{i=1}^{n} a_i X^i + b_i Y^i + c,$$

wherein X, Y and Z denote Cartesian coordinates of the respective point on the initial projection surface, Z corresponds to a height above a predefined ground plane, on which the vehicle is located, n is an even integer equal to or greater than four, and $a_i$, $b_i$ and c are predefined real coefficients, and/or wherein the final projection surface is given by points fulfilling equation $$Z = \sum_{i=1}^{n'} a'_i X^i + b'_i Y^i + c',$$

wherein X, Y and Z denote Cartesian coordinates of the respective point on the final projection surface, Z corresponds to a height above the ground plane, n' is an even integer equal to or greater than four, and $a_i'$, $b_i'$ and c' are predefined real coefficients.

11. The computer-implemented method according to claim 1, wherein the initial projection surface comprises an initial base portion, which is given by an initial part of a predefined ground plane, on which the vehicle is located, wherein the vehicle is located within the initial base portion, and an initial raised portion that adjoins the initial base portion at an outer boundary of the initial base portion, and/or wherein the final projection surface comprises a final base portion, which is given by a final part of the ground plane, wherein the vehicle is located within the final base portion, and a final raised portion that adjoins the final base portion at an outer boundary of the final base portion.

12. An electronic vehicle guidance system for a vehicle, comprising at least one computing unit, which stores a predefined initial projection surface and a predefined final projection surface and is configured to:

receive a video stream depicting an environment of the vehicle from a camera system of the vehicle and to buffer the video stream in a buffer storage, wherein the buffer storage is updated at a predefined frame rate;

read out image data from the buffer storage at a predefined readout rate at an initial readout instance, a plurality of consecutive intermediate readout instances and a final readout instance;

determine a set of initial sampling points on the initial projection surface and a set of final sampling points on the final projection surface, wherein each final sampling point is assigned to exactly one of the initial sampling points;

determine, for each of the intermediate readout instances, a set of intermediate sampling points, wherein each intermediate sampling point interpolates between one of the final sampling points and the respective assigned initial sampling point, and to determine an intermediate projection surface containing the set of intermediate sampling points; and project, for each of the intermediate readout instances, the read out image data to the respective intermediate projection surface and control a display device of the vehicle to display an intermediate image depending on the projected image data.

13. The electronic vehicle guidance system according to claim 12, wherein the readout rate is equal to or smaller than a refresh rate of the display device, and/or wherein the readout rate is greater than the frame rate.

14. A non-transitory computer-readable storage medium comprising a computer program comprising instructions, which, when executed by at least one computing unit, cause the at least one computing unit to carry out a computer-implemented method according to claim 1.

* * * * *